United States Patent Office 3,342,784
Patented Sept. 19, 1967

3,342,784
ANIONIC POLYMERIZATION OF LACTAMS WITH AMIDO-AZOLES AS PROMOTERS
Robert Gehm, Ludwigshafen (Rhine), Gustav Steinbrunn, Schwegenheim, Pfalz, and Wolfgang Jentzsch, Hans Wilhelm, Friedrich Bayerlein, and Otto von Schickh, Ludwigshafen (Rhine), Germany, assignors to Badische Anilin- & Soda-Fabrik Aktiengesellschaft, Ludwigshafen am Rhine, Germany
No Drawing. Filed Jan. 14, 1964, Ser. No. 337,525
Claims priority, application Germany, Jan. 16, 1963, B 70,344
4 Claims. (Cl. 260—78)

This invention relates to a process for the anionic polymerization of lactams in the presence of alkaline catalysts and activators.

According to a prior process, polyamides are manufactured by polymerization of monomeric lactams in the presence of alkaline catalysts, for example alkali metals, such as sodium and potassium or their basic compounds, at temperatures of more than 200° C.

It is also known that this process, usually known as "anionic polymerization" can be carried out under considerably milder conditions in the presence of activators. Acylated lactams, such as N-acetylcaprolactam, or compounds having an acylating action, such as isocyanates, ketenes, acid chlorides, carbodiimides, cyanamides and acid anhydrides, and also compounds which bear sulfonyl, phosphenyl, nitroso, thiocarbonyl or thiophosphenyl radicals on the lactam nitrogen, have been proposed as activators. The sensitivity of these compounds to water and oxygen however makes it necessary to carry out the process in an anhydrous medium and in the absence of oxygen. They are not very suitable for polymerizing commercially pure lactams, which always contain a small amount of water.

Carboxylic esters, urethanes and multi-acylated amines are also known as activators. These compounds are less physiologically dangerous than the abovementioned activators, some of which are strongly caustic, but their accelerating effect is considerably less.

According to another proposal the anionic polymerization of lactams has been accelerated by compounds having the formulae $(R)_2-N-CX-N-(R)_2$, $(R)_2-N-CO-OR$ and $(R)_2-N-C(NR)-R$ in which X denotes oxygen, sulphur or the bivalent group >NR and R denotes hydrogen or any organic radical and at least one R attached to nitrogen denotes an organic radical. The effective compounds are derived from the primary compounds (urea, thiourea, guanidine, urethane, amidine and isothiourea) by replacing at least one of the hydrogen atoms attached to nitrogen by an organic radical. The "pot life" cannot always be adequately influenced with these compounds.

According to the present invention, a compound having the general formula:

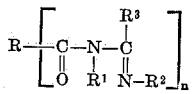

is used as an activator.

In the formula, $n$ denotes one of the integers 1 and 2, $R^1$ and $R^2$ each denotes a monovalent hydrocarbon radical having one to seven carbon atoms, for example alkyl, aryl or aralkyl radicals such as a methyl, ethyl, butyl, hexyl, phenyl, tolyl or benzyl radical, or $R^1$ and $R^2$ if combined together denote a divalent radical, for example an ethylene radical ($-CH_2-CH_2-$), an etheno radical ($-CH=CH-$) or a phenylene radical ($C_6H_4=$), $R^3$ denotes a hydrogen atom or a hydrocarbon radical selected from the group consisting of alkyl, aryl and aralkyl radicals, having one to eight carbon atoms, for example a methyl, ethyl, butyl, phenyl or tolyl radical. When $n$ is 1, R denotes an alkylamino radical, arylamino radical or aralkylamino radical having one to fourteen carbon atoms, for example a N-methylamino, N-ethylamino, N-propylamino, N-butylamino, phenylamino, N,N-diphenylamino, and a N-methyl-N-phenylamino radical. When $n$ is 2, R denotes a divalent radical having the formula

in which $R^4$ denotes a divalent hydrocarbon radical e.g. an alkylene radical having two to fifteen carbon atoms.

Examples of suitable compounds of this kind are imidazole-1-carboxylic anilide, benzimidazole-1-carboxylic-(N'-methyl)-anilide, imidazole - 1 - carboxylic-N',N'-diphenylamide, phenylcarbamyl-N,N'-dipropylformamidine, ethylcarbamyl-N,N'-dimethylformamidine, N-phenylcarbamyl-(2-methyl)-imidazoline, N,N'-hexamethylene - bis - (carbamyl-dimethylformamidine):

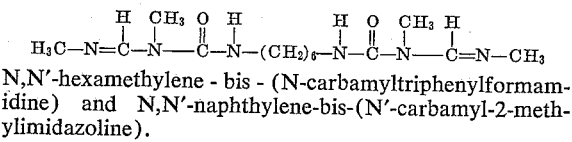

N,N'-hexamethylene - bis - (N-carbamyltriphenylformamidine) and N,N'-naphthylene-bis-(N'-carbamyl-2-methylimidazoline).

The compounds may be prepared by conventional methods, for example by reaction of diisocyanates with amidines or by reaction of carbamic acid chlorides with suitable compounds, such as imidazole, benzimidazole and the like. The reactions are preferably carried out in inert solvents, for example benzene. See, for example, 95 Chemische Verichte 1305 (1962); Annalene der Chemie, 1958, pp. 187–193; and Annalen der Chemie, 1959, pp. 23 and 24.

The advantage of the new activators as compared with the prior art activators is that addition of conventional chain regulators is no longer necessary. Furthermore the pot life and the K-value may be varied considerably.

For example a K-value of about 60 is obtained after a pot life of four minutes.

Polymerization may be carried out conventionally by allowing the lactam to be polymerized, or a portion thereof, to react with a small amount of an alkaline reaction initiator (catalyst), adding an activator according to this invention and heating the reaction mixture, at least locally, to polymerization temperature. Local heating is sufficient because the polymerization is exothermic and the reaction mixture thus heats up further spontaneously. It is also possible however first to heat up the lactam to be polymerized to the polymerization temperature and to initiate the polymerization by adding the activator which may if desired be dissolved in the lactam. In principle, however, the individual components of the polymerization mixture may be added to each other in any sequence.

The activator may be used in an amount of 0.001 to 15% by weight, preferably 0.5 to 5% by weight, with reference to the weight of the lactam to be polymerized. For special purposes however amounts deviating from these may be used. It is obviously also possible to use mixtures of the new activators in any proportions.

The polymerization is advantageously carried out at temperatures between 80° and 160° C., preferably between 100° and 130° C., although temperatures higher or lower than these ranges may be chosen for particular purposes. Prior art catalysts, such as alkali metal catalysts or alkaline earth metal catalysts, may be used as polymerization catalysts. Alkali metal catalysts and alkaline earth metal catalysts are intended in this specification to include not only the metals, such as sodium, potassium or calcium, but also their basic compounds, such as the amides or hydrides, the alkali metal lactam compounds, such as sodium caprolactamate, or the organo-metallic compounds of metals of groups IA to IIA of the Periodic System (Handbook of Chemistry and Physics, 38th edition, 1956–1957, pp. 394–395).

Lactams having five to fourteen ring members which may be polymerized according to the new process are particularly pyrrolidone, piperidone, caprolactam, capryllactam, oenanthic lactam, capric lactam, laurolactam, substituted lactams, such as ε-ethyl-ε-caprolactam, ʓ-ethyl-ʓ-oenantholactam or methylene-bis-caprolactam, which can be prepared by reaction of methylene-bis-cyclohexanones with hydroxylamine and subsequent Beckmann rearrangement, or mixtures of the said compounds.

The polymerization may also be carried out in the presence of inert solvents, such as aliphatic and aromatic hydrocarbons, ethers and the like. In this case polyamide powder is obtained which is suitable for example for the production of coatings by the fluidized bed method, for the clarification of beverages or as a bonding agent for non-woven fabrics.

Soluble or insoluble dyes and fillers of all kinds may be incorporated into the polymerization mixture provided they do not interfere with the action of the activator-catalyst system. These fillers include the conventional plastics or also, inter alia, inorganic substances, such as glass fibers, asbestos and other ceramic materials, graphite, gypsum, chalk, molybdenum sulphide and natural materials, such as pretreated wood flour, natural, synthetic and semisynthetic fibers and the like.

The process may be carried out batchwise or continuously, for example in the polymerization tubes or also in polymerization towers having discharge means, such as spinning pumps or extruders. Tubes, rods, sheets, films, tapes and the like and also threads, including those for tire cords, may be directly prepared in this way.

The process according to the invention is also suitable for the production of larger blocks of polyamides, for the production of complicated molded articles by melt casting, centrifugal casting or roll casting, for the production of expanded molded articles, of corrosion-resistant polyamide coatings, for the construction of tough elastic interlayers, for bonding, joining and laminating conventional materials under the conditions of anionic polymerization. The polyamides obtained may also be granulated and then processed by the usual methods, for example injection molded, extruder or spun.

The invention is further illustrated by the following examples. The parts and percentages specified in the examples are parts by weight and percentages by weight. The K-values given have been measured according to H. Fikentscher, Cellulosechemie 13 (1932), 60.

*Example 1*

25 parts of caprolactam and 14 parts of a 17% solution of sodium caprolactam in coprolactam are fused together. A solution, heated to 150° C., of 2 parts of benzimidazole-1-carboxylic anilide in 25 parts of caprolactam is mixed with the said melt under nitrogen at 150° C. and polymerization carried on at the said temperature. The polymer solidifies after eight minutes. The polymer has a K-value of 50 to 60. Conversion is 93.6% of the theory.

*Example 2*

150 parts of caprolactam and 80 parts of a 20% solution of sodium caprolactam in caprolactam are fused together and intensely mixed at 150° C. with a solution of 12 parts of imidazole-1-carboxylic acid-N′,N′-diphenylamide in 150 parts of caprolactam under nitrogen. The mixture begins to polymerize after a few seconds and solidifies after about three minutes. The polyamide has a K-value of 50 to 60. Conversion is 93.4%.

By using a total of 80 parts of caprolactam with 5.6 parts of the sodium caprolactam solution and 1.6 parts of the said activator, an unmeasurable K-value is obtained after a polymerization period of six minutes at 130° C. and subsequent heating at 130° C. for one hour.

*Example 3*

250 parts of caprolactam and 100 parts of a 20% solution of sodium caprolactam in caprolactam are fused. The melt is heated to 150° C. under nitrogen and mixed with a solution, heated to the same temperature, of 20 parts of benzimidazole-1-carboxylic acid (N′-methyl)-anilide in 250 parts of caprolactam and polymerized at 150° C. The polymer (K-value 90 to 100) solidifies after five minutes. Conversion is 94.1%.

*Example 4*

25 parts of caprolactam is heated with 4 parts of a 17% sodium caprolactam solution in caprolactam under nitrogen to 130° C. A solution, heated to 130° C., of 4 parts of 2-methylimidazoline-N(1)-carboxylic acid-N′,N′-diphenylamide in 25 parts of caprolactam is added to the said solution. The mixture is heated under nitrogen for three hours at 130° to 150° C. The polyamide is solid and soluble in alcohol.

*Example 5*

40 parts of caprolectam and 5.6 parts of a 17% sodium caprolactam solution in caprolactam are heated to 130° C. under nitrogen and mixed with a solution, heated to the same temperature, of 1.6 parts of N,N′-hexamethylene-bis-(carbamyldimethylformamidine) in 40 parts of caprolactam. Polymerization is carried out at 130° C. The melt solidifies after four minutes. The K-value is 57.

*Example 6*

15 parts of caprolactam is mixed with 1.75 parts of a 17% solution of sodium caprolactam in caprolactam and the whole heated to 130° C. under nitrogen. A solution, heated to 130° C. of 1 part of hexamethylene-bis-(N′-carbamyl-2-methylimidazoline) having the formula:

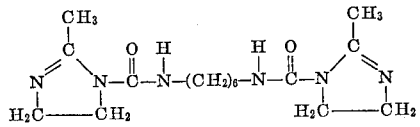

in 15 parts of caprolactam is added to this melt under nitrogen. The mixture immediately begins to gel and has solidified to a solid polymer within three minutes.

By using 0.9 part of the sodium caprolactam solution and 0.5 part of hexamethylene-bis-(N-carbamyl-triphenyl-formamidine) having the formula:

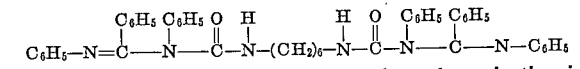

and proceeding as described above, the polymerization is over within twelve minutes.

*Example 7*

4.5 parts of sodium methylate is dissolved in 300 parts of pure pyrrolidone with good stirring. Then 53 parts of pyrrolidone together with the methanol formed are distilled off at a bottom temperature of 100° to 120° C. under subatmospheric pressure (12 mm. Hg). Atmospheric pressure is then restored by adding high purity nitrogen. 350 parts of cyclohexane and 3 parts of imidazole-1-carboxylic diphenylamide are then added and the mixture is stirred. The polymer paste obtained is boiled up twice with methanol and dried under subatmospheric pressure (12 mm. Hg) at 70° C. 128 parts of polypyrrolidone is obtained as a pure white powder. The K-value, determined with a 1% solution in 99% formic acid, is 91.

By proceeding in the same way but without adding imidazole-1-carboxylic diphenylamide, only 4.6 g. of polypyrrolidone is obtained having a K-value of 92.

We claim:
1. In a process for the activated anionic polymerization of lactams by heating a mixture of (A) lactam having from five to fourteen ring members, (B) an alkaline cata- lyst selected from the group consisting of alkali metal catalysts and alkaline earth metal catalysts and (C) an activator to a temperature of between 80° and 160° C., the improvement which comprises adding as the activator a compound having the general formula:

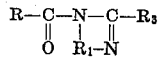

wherein $R_1$ represents a bivalent radical selected from the group consisting of ethylene and phenylene, $R_3$ represents a member selected from the group consisting of hydrogen and a monovalent hydrocarbon radical having 1–8 carbon atoms and R represents an arylamino radical having 6–12 carbon atoms.

2. A process as claimed in claim 1 wherein the activator used is benzimidazole-1-carboxylic anilide.

3. A process as claimed in claim 1 wherein the activator used is imidazole-1-carboxylic acid-N′,N-diphenylamide.

4. A process as claimed in claim 1 wherein the activator used is benzimidazole-1-carboxylic acid-(N′-methyl)-anilide.

References Cited

UNITED STATES PATENTS 3,148,174   9/1964   Glickman et al. ------ 260—78

FOREIGN PATENTS 678,677   1/1964   Canada.

WILLIAM H. SHORT, *Primary Examiner.*

H. D. ANDERSON, *Assistant Examiner.*